United States Patent [19]
Ono et al.

[11] Patent Number: 6,033,072
[45] Date of Patent: Mar. 7, 2000

[54] LINE-OF-SIGHT-INFORMATION INPUT APPARATUS AND METHOD

[75] Inventors: Tachio Ono, Kawasaki; Masahito Yamazaki, Yokohama, both of Japan

[73] Assignee: Canon Kabushiki Kaisha, Tokyo, Japan

[21] Appl. No.: 09/164,273

[22] Filed: Oct. 1, 1998

[30] Foreign Application Priority Data

Oct. 7, 1997 [JP] Japan ................................. 9-289228

[51] Int. Cl.⁷ ........................................... A61B 3/14
[52] U.S. Cl. ............................................. 351/208; 396/51
[58] Field of Search .................................. 351/200, 205, 351/206, 208; 396/51, 104, 121, 123

[56] References Cited

U.S. PATENT DOCUMENTS

| | | | |
|---|---|---|---|
| 5,671,447 | 9/1997 | Tokunaga | 396/51 |
| 5,737,642 | 4/1998 | Aoyama | 396/51 |
| 5,930,533 | 7/1999 | Yamamoto | 396/121 |

*Primary Examiner*—George Manuel
*Attorney, Agent, or Firm*—Fitzpatrick, Cella, Harper & Scinto

[57] ABSTRACT

By providing a line-of-sight-information detection device for detecting an angle of rotation of an eyeball, an individual-difference correction unit for correcting the detected angle of rotation of the eyeball for each individual, an individual-difference preserving unit for preserving line-of-sight information in which individual difference is corrected, a line-of-sight-information processing unit for calculating a line-of-sight position based on the corrected angle of rotation of the eyeball and generating an event at the line-of-sight position, and an event transmission unit for transmitting the event to a host system, it is possible to use line-of-sight information as a new basis for controlling a graphical user interface. Thus, the user's hands are used only on a keyboard, and the functions of a mouse, which has conventionally been operated by the user's hand, can be provided by the user's line of sight. As a result, it is possible, for example, to improve the operational efficiency.

21 Claims, 12 Drawing Sheets

LINE-OF-SIGHT-INFORMATION INPUT APPARATUS AND METHOD

BACKGROUND OF THE INVENTION

1. Field of the Invention

The present invention relates to a line-of-sight-information input apparatus and method. More particularly, the invention relates to a light-of-sight-information input apparatus and method which is suitable for realizing a function as an interactive device between a user and a computer by utilizing line-of-sight information detected by a line-of-sight detection device and transmitting an event message to a graphical user interface displayed on a display device of the computer.

2. Description of the Related Art

Houses and keyboards are typical conventional user interfaces. The user can move a mouse pointer on a window by operating a mouse, or can operate a window application program by clicking or double-clicking a mouse button for a graphical user interface, such as Windows of the Microsoft Corporation, MacIntosh of the Apple Corporation, or X-Window developed by the MIT (Massachusetts Institute of Technology). The user can also input a character which is difficult to input with a mouse, by using a keyboard in addition to the mouse.

In conventional mouse devices, when the user moves a mouse, the OS (operating system) of the computer moves a mouse pointer on a display in accordance with the moved distance of the mouse, in response to a mouse-pointer movement event message sent to the OS of the computer by the mouse. By clicking or double-clicking a mouse button, a mouse-click/double-click event message is transmitted to the OS, which performs an appropriate action for each application program.

In the above-described conventional technique, when utilizing a mouse in a graphical user-interface environment, the user can display a plurality of application programs on a display device of a computer. When the user intends to perform an input operation for one of these application programs, it is necessary that the window of that application program is active (in a state capable of being used). Usually, the window can be made active by moving a mouse pointer to the application window and clicking or double-clicking a mouse button.

In the conventional technique, however, when the user intends to perform an input operation through a keyboard for an application program and then perform an input operation for another application program, it is necessary that the user first releases his hand from the keyboard and then activates the window of the application to be used active by operating a mouse. Such a procedure is inefficient in practice.

SUMMARY OF THE INVENTION

The present invention has been made in consideration of the above-described problems.

It is an object of the present invention to provide a line-of-sight-information input apparatus and method in which line-of-sight information can be used as a new device for a graphical user interface, and the user is only required to use his hands for the keyboard, the mouse being operated with line-of-sight information instead of by hand as conventionally, resulting in improvement in operational efficiency.

According to one aspect, the present invention which achieves the above-described object relates to a line-of-sight-information input apparatus for performing an input operation by utilizing a line of sight. The apparatus includes detection means for detecting an angle of rotation of an eyeball, correction means for correcting the detected angle of rotation of the eyeball for each individual, control means for calculating a line-of-sight position based on the corrected angle of rotation of the eyeball and generating an event at the line-of-sight position, and transmission means for transmitting the event to a host system.

According to another aspect, the present invention which achieves the above-described object relates to a line-of-sight-information input apparatus for performing an input operation by utilizing a line of sight. The apparatus includes detection means for detecting an angle of rotation of an eyeball, control means for identifying a state of opening/closing of the eyeball based on the detected angle of rotation of the eyeball and generating an event based on a time period of closure of the eyeball, and transmission means for transmitting the event to a host system.

According to still another aspect, the present invention which achieves the above-described object relates to a line-of-sight-information input apparatus for performing an input operation by utilizing a line of sight. The apparatus includes detection means for detecting an angle of rotation of an eyeball, control means for calculating a gaze point in consideration of fluctuation of the eyeball based on the detected angle of rotation of the eyeball and generating an event at the gaze point, and transmission means for transmitting the event to a host system.

According to still another aspect, the present invention which achieves the above-described object relates to a line-of-sight-information input method for performing an input operation by utilizing a line of sight. The method includes a detection step of detecting an angle of rotation of an eyeball, a correction step of correcting the detected angle of rotation of the eyeball for each individual, a control step of calculating a line-of-sight position based on the corrected angle of rotation of the eyeball and generating an event at the line-of-sight position, and transmitting the event to a host system.

According to still another aspect, the present invention which achieves the above-described object relates to a line-of-sight-information input method for performing an input operation by utilizing a line of sight. The method includes a detection step of detecting an angle of rotation of an eyeball, a control step of identifying a state of opening/closing of the eyeball based on the detected angle of rotation of the eyeball and generating an event based on a time period of closure of the eyeball, and a transmission step of transmitting the event to a host system.

According to still another aspect, the present invention which achieves the above-described object relates to a line-of-sight-information input method for performing an input operation by utilizing a line of sight. The method includes a detection step of detecting an angle of rotation of an eyeball, a control step of calculating a gaze point in consideration of fluctuation of the eyeball based on the detected angle of rotation of the eyeball and generating an event at the gaze point, and a transmission step of transmitting the event to a host system.

According to still another aspect, the present invention which achieves the above-described object relates to a storage medium storing a program for performing an input operation by utilizing a line of sight. The program includes a detection module for detecting an angle of rotation of an eyeball, a correction module for correcting the detected angle of rotation of the eyeball for each individual, an event generation module for calculating a line-of-sight position based on the corrected angle of rotation of the eyeball and generating an event at the line-of-sight position, and transmission means for transmitting the event to a host system.

The foregoing and other objects, advantages and features of the present invention will become more apparent from the following detailed description of the preferred embodiments taken in conjunction with the accompanying drawings.

DETAILED DESCRIPTION OF THE PREFERRED EMBODIMENTS

Figure 1:
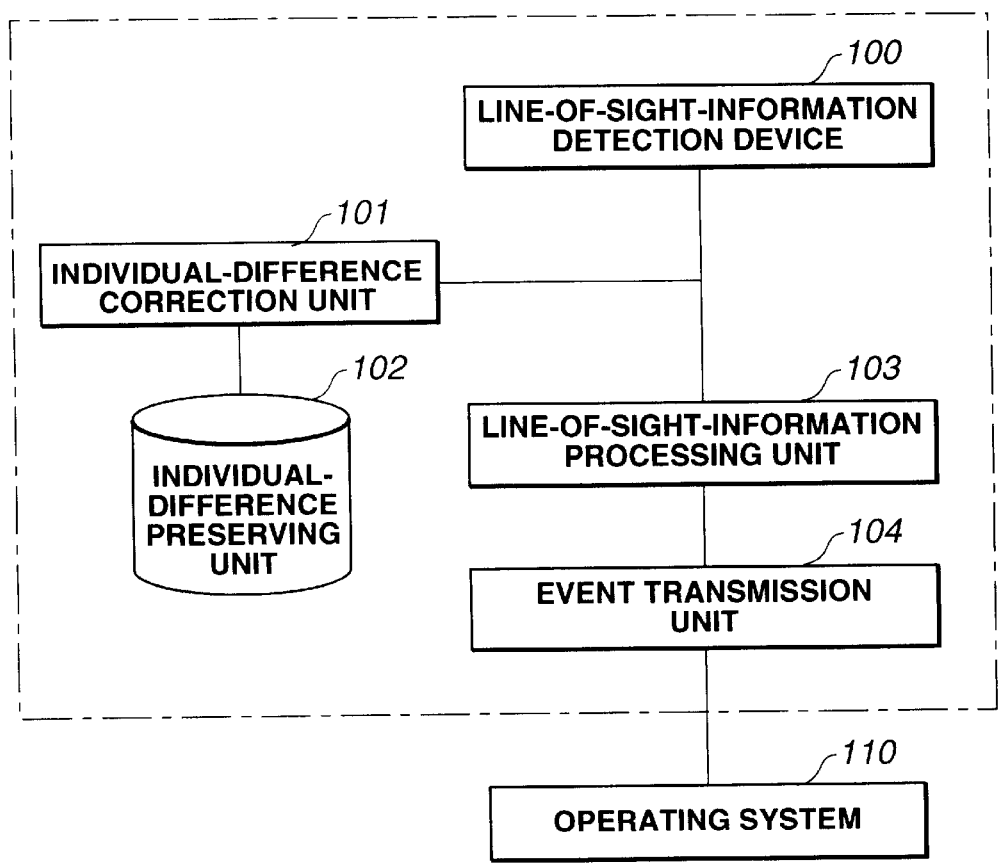
FIG. 1 is a block diagram illustrating the configuration of a line-of-sight user interface to which any one of the first through eighth embodiments of the present invention can be applied.

Preferred embodiments of the present invention will now be described with reference to the drawings.
First Embodiment FIG. 1 is a block diagram illustrating the configuration of a line-of-sight user interface according to a first embodiment of the present invention. The line-of-sight user interface of the first embodiment includes a line-of-sight-information detection device 100, an individual-difference correction unit 101, a individual-difference preserving unit 102, a line-of-sight-information processing unit 103 and an event transmission unit 104. Reference numeral 110 represents an operating system (hereinafter abbreviated as "OS") of a computer (not shown).

The line-of-sight-information detection device 100 is mountable on a user in order to acquire an image of an eyeball of the user, and to detect an angle of rotation of the eyeball and whether the eyelid is open or closed. The individual-difference correction unit 101 corrects the angle of rotation of the eyeball obtained by the line-of-sight-information detection unit 100 in consideration of individual differences (i.e., relevant characteristics peculiar to the user). The individual-difference preserving unit 102 preserves individual-difference data of the corrected angle of rotation of the eyeball, which data indicates the correction.

The line-of-sight-information processing unit 103 processes line-of-sight information corrected by the individual-difference correction unit 101 based on individual differences, and generates an event to be supported by the OS 110 of the computer. The event transmission unit 104 transmits an event message generated by the line-of-sight-information processing unit 103 to the OS 110 of the computer.

Next, operations in the line-of-sight user interface of the first embodiment having the above-described configuration will be described.

The line-of-sight-information detection unit 100 detects information relating to the angle of rotation of the eyeball according to a known method, such as a method for obtaining the angle of rotation of the eyeball from the positional relationship between light reflected from the cornea and the center of the pupil, and detects blink information by interception of light from the cornea. Since the detected angle of rotation of the eyeball varies with the individual, ceteris paribus correction is performed by the individual-difference correction unit 101. According to this correction, correlation between the line-of-sight position and the angle of rotation of the eyeball of each user can be obtained. By preserving this correction information in the individual-difference preserving unit 102, it becomes unnecessary to perform individual-difference correction each time another user uses the computer.

The line-of-sight-information processing unit 103 calculates a line-of-sight position by receiving the corrected angle of rotation of the eyeball from the individual-difference correction unit 101. The line-of-sight position on a display is determined by the distance D (mm) from the display to the head (the surface of the eyeball) from the corrected angle of rotation of the eyeball. When, for example, detecting the angle of rotation of the right eye, the angle of rotation of the eyeball has positive values and negative values in the upward and downward vertical directions, and in the rightward and leftward horizontal directions, respectively. The vertical and horizontal coordinates are calculated according to the following equations:

the vertical coordinate=the vertical central coordinate+[D×tan(the angle of rotation of the eyeball in the vertical direction))]/the pixel length (1.1), the horizontal coordinate=the horizontal central coordinate−[D× tan(the angle of rotation of the eyeball in the horizontal direction))]/the pixel length (1.2).

The coordinate system is expressed in units of pixels, taking the upper left point on the display as the origin. The vertical and horizontal central coordinates are assumed to be central points in the vertical and horizontal directions, respectively, on the display. For example, the distance from the display to the head (the surface of the eyeball) is 600 mm, and a 20-inch display with a VGA (Video Graphics Array: an LSI for graphic control in an IBM PS/2) mode having a display resolution of 640×480 is used.

At that time, the pixel length is 0.635 mm, the vertical central coordinate is 240, and the horizontal central coordinate is 320. If the vertical angle of rotation of the eyeball is 3 degrees, and the horizontal angle of rotation of the eyeball is 8 degrees, the coordinates of the line of sight on the display are:

$$\text{the vertical coordinate} = 240 - [600 \times \tan(3)] / 0.635 \qquad (1.3)$$
$$= 190.5,$$

$$\text{the horizontal coordinate} = 320 - [600 \times \tan(8)] / 0.635 \qquad (1.4)$$
$$= 187.2,$$

so that the user's line of sight sees a coordinate position (190.5, 187.2) on the display.

When the line-of-sight position on the display is obtained in the system in the above-described manner, the event transmission unit 104 transmits a pointer movement event message to the OS 110 of the computer, which moves the pointer to the line-of-sight position. It is thereby possible to utilize the line of sight instead of a mouse device.

Actually, however, since a human eyeball makes jumping movements, i.e., does not move smoothly like a pointer operated by an ordinary mouse device, a pointer according to the line of sight is moved and displayed in a jumping manner. If the pointer is displayed in such a manner, however, the pointer subjects the user to stress. In the system of the first embodiment, this problem is solved by moving smoothly the pointer by performing interpolating display.

Linear interpolation is performed between the line-of-sight position calculated by the line-of-sight-information processing unit 103 and the line-of-sight position calculated at the immediately preceding time. The interval of interpolation is set to be within such a range that no psychological stress is given to the user. The interval of interpolation may, of course, not be set. Since the line-of-sight-information processing unit 103 also holds the time of detection, this time is utilized for a timing for interpolating display.

For example, suppose that, when performing interpolation display n times, the interval between the latest detection of the line-of-sight position (X_new, Y_new) and the detection of the preceding line-of-sight position (X_old, Y_old) is T_int (msec). In this case, the coordinates (X(i), Y(i)) where the pointer is subjected to interpolation display are:

$$X(i) = X\_old + (X\_new - X\_old)/n \times i \, (i=0, 1, 2, \ldots, n) \qquad (1.5)$$

$$Y(i) = Y\_old + (Y\_new - Y\_old)/n \times i \, (i=0, 1, 2, \ldots, n) \qquad (1.6).$$

The pointer is displayed with an interval of t_int=T_int=T_int/n.

In the system of the first embodiment, the event transmission unit 104 transmits a pointer movement event message to the OS 110 with the interval t_int in order to perform interpolation display. However, when the line-of-sight-information processing unit 103 has calculated the latest line-of-sight position during interpolation display, the event transmission unit 104 interrupts interpolation display of the pointer, and again calculates the positions of interpolation display and displays the calculated positions, always utilizing the latest line-of-sight position.

Figure 2:
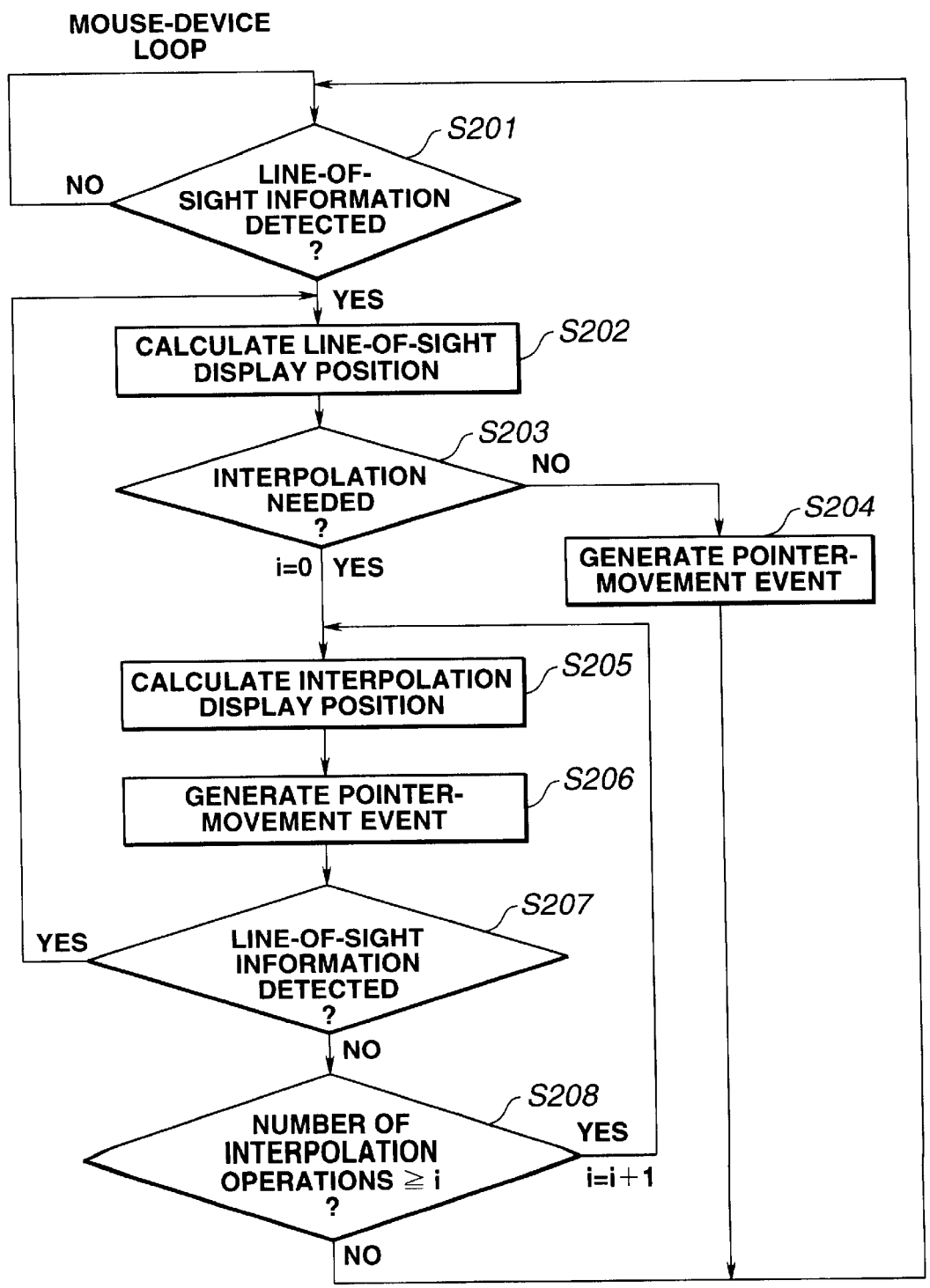
FIG. 2 is a flowchart illustrating the flow of processing in the line-of-sight user interface according to a first embodiment of the present invention.

Next, a description will be provided of the flow of processing in the line-of-sight user interface in the first embodiment with reference to the flowchart shown in FIG. 2. In the first embodiment, a mouse device and a line-of-sight device can be used together, and the operation is started when the user mounts the line-of-sight-information detection device 100.

First, in step S201, it is determined if the line-of-sight-information detection device 100 has detected line-of-sight information. If the line-of-sight-information detection device 100 is not mounted on the user, a mouse can be used instead. When the line-of-sight-information detection device 100 is mounted on the user and line-of-sight information has been detected, the process proceeds to step S202. In step S202, the line-of-sight information detected in step S201 is processed by the line-of-sight-information processing unit 103, which calculates the position where a line-of-sight pointer is to be displayed.

Then, in step S203, it is determined whether interpolation of the pointer position is needed. If the result of the determination in step S203 is negative, the process proceeds to step S204. In step S204, the event transmission unit 104 transmits a pointer movement event message to the OS 110 of the computer. The OS 110 moves (displays) the pointer to the line-of-sight display position calculated by the line-of-sight-information processing unit 103 in step S202.

If the result of the determination in step S203 is affirmative, the process proceeds to step S205, where a counter for counting the number of interpolation operations is reset to 0, and a line-of-sight interpolation display position when linearly interpolating a portion between the latest line-of-sight display position and the immediately preceding line-of-sight display position by a number of interpolation operations defined by the user is calculated.

Then, in step S206, the event transmission unit 104 transmits a pointer movement event message to the OS 110 of the computer. The OS moves (displays) the pointer to (at) the line-of-sight interpolation display position calculated in step S205. An interpolation display operation is performed by returning to step S205 until the number of interpolation operations reaches the number assigned by the user in step S208. This loop is repeated with the above-described interval T_int.

When the line-of-sight-information detection unit 100 has detected the latest line-of-sight information and a line-of-sight position has been calculated by the line-of-sight-information processing unit 103, the process returns from step S207 to step S202, and the latest line-of-sight display position is calculated and the interpolation display process is again executed. In this system, according to the determination in step S207, it is possible always to display the latest line-of-sight position. Upon completion of inter-polation display, the process returns from step S208 to step S201, where detection of the next line-of-sight information is awaited.

As described above, according to the first embodiment, the line-of-sight user interface includes the line-of-sight-information detection device 100 for detecting the angle of rotation of an eyeball, the individual-difference correction unit 101 for correcting the detected angle of rotation of the eyeball according to the individual user, the individual-difference preserving unit 102 for preserving line-of-sight information obtained by thus correcting for individual differences, the line-of-sight-information processing unit 103 for calculating a line-of-sight position based on the corrected angle of rotation of the eyeball and generating an event at the calculated line-of-sight position, and an event transmission unit 104 for transmitting the event to the OS 110. Hence, it is possible to move a mouse pointer by utilizing line-of-sight information instead of operating a mouse as in the conventional approach. It is also possible to use several application programs smoothly without the releasing one or both hands from the keyboard. Furthermore, by using the angle of rotations of the user's eyeball instead of clicking or double clicking a mouse button, it is possible to generate an event to be supported by the OS 110.

As a result, it is possible to use line-of-sight information as a new device for a graphical user interface. Thus, it is unnecessary to alternate between mouse and keyboard. Instead, the user's hands are used only on the keyboard, and the mouse, which has previously been operated by the user's hand, can be operated by the user's line of sight.

That is, since conventionally, the keyboard and the mouse are operated by the user's hands, a redundant movement of a hand between the keyboard and the mouse is required when using a plurality of application programs on a display, resulting in inefficient operation. To the contrary, by operating a mouse button by the user's line of sight, the user's hands are used only on the keyboard, resulting in improvement in operational efficiency.

When, for example, the eye is tired, the user can switch from input operation using line-of-sight information to input operation using the mouse, by operating the keyboard.

Second Embodiment

As in the above-described first embodiment, a line-of-sight user interface according to a second embodiment of the present invention includes a line-of-sight-information detection device 100, an individual-difference correction unit 101, an individual-difference preserving unit 102, a line-of-sight-information processing unit 103 and an event transmission unit 104 (see FIG. 1). Reference numeral 110 represents an operating system (OS). Since the configuration of each unit has already been described in the first embodiment, further description thereof will be omitted.

In an ordinary mouse device, an event is generated for an OS of a computer by depressing a button provided on the mouse, in order to operate an application program.

In the second embodiment, an application program is operated by generating and transmitting an event to be supported by the OS 110, as described in the first embodiment, by opening/closing the user's eyes. In the second embodiment, a processing mechanism for transmitting a virtual event message to the OS 110 by performing an opening/closing of the eyes in the system described in the first embodiment is realized.

Usually, humans unconsciously open and close, i.e., blink, their eyes. Hence, in the second embodiment, generation/transmission of an event to be supported by the OS 110 is performed by changing the time period of closure of the eyes. The time period of closure of the eyes can be set for each individual so as not to subject the user to stress.

In the second embodiment, when the line-of-sight-information detection device 100 has detected line-of-sight information, the line-of-sight-information processing unit 103 determines if the line-of-sight information acquired by the line-of-sight-information detection device 100 represents the angle of rotation of an eyeball (the line-of-sight position) or opening/closing of the eyes. When it has been determined that the information represents opening/closing of the eyes, the event transmission unit 104 transmits an event message to the OS 110.

For example, When the user sets the time-interval thresholds of event A and B to 1 second and 2 seconds, respectively, if the line-of-sight-information processing unit 103 acquires information relating to opening/closing of the eyes from the line-of-sight-information detection device 100, the time period of closure of the eyes is measured. After the lapse of 1 second, the event transmission unit 104 transmits an event-A message to the OS 110. After the lapse of 2 seconds, the event transmission unit 104 transmits an even-B message to the OS 110.

It is possible to set in advance time-period thresholds by setting system parameters in the line-of-sight user interface of the second embodiment. That is, by setting different time-interval thresholds, various events to be supported by the OS 110 can be generated in the line-of-sight user interface. Furthermore, as in the first embodiment, a mecha-nism to process line-of-sight-position information and move/display a pointer is also realized.

Figure 3:
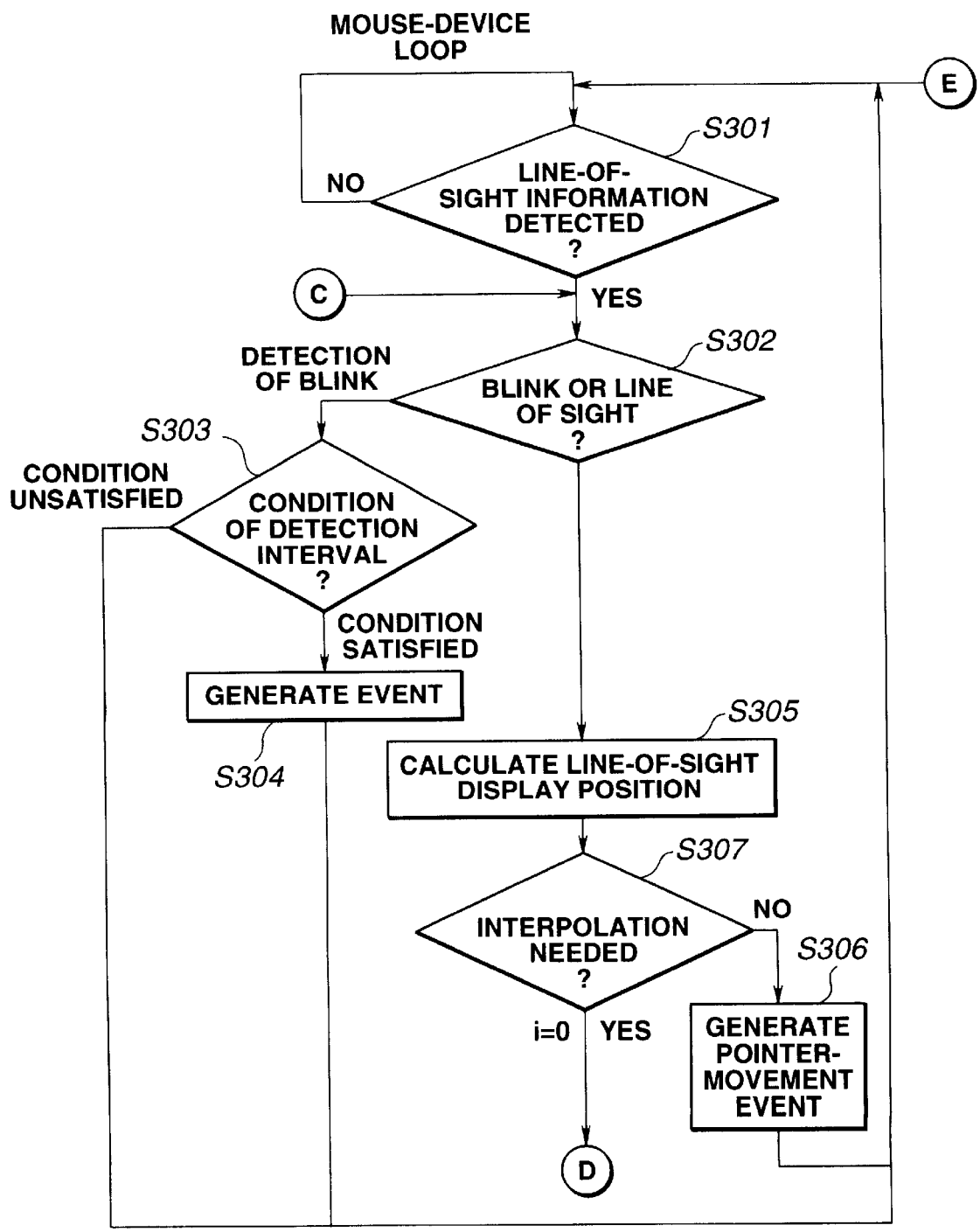
FIGS. 3 and 4 are flowcharts illustrating the flow of processing in the line-of-sight user interface according to a second embodiment of the present invention.
Figure 4:
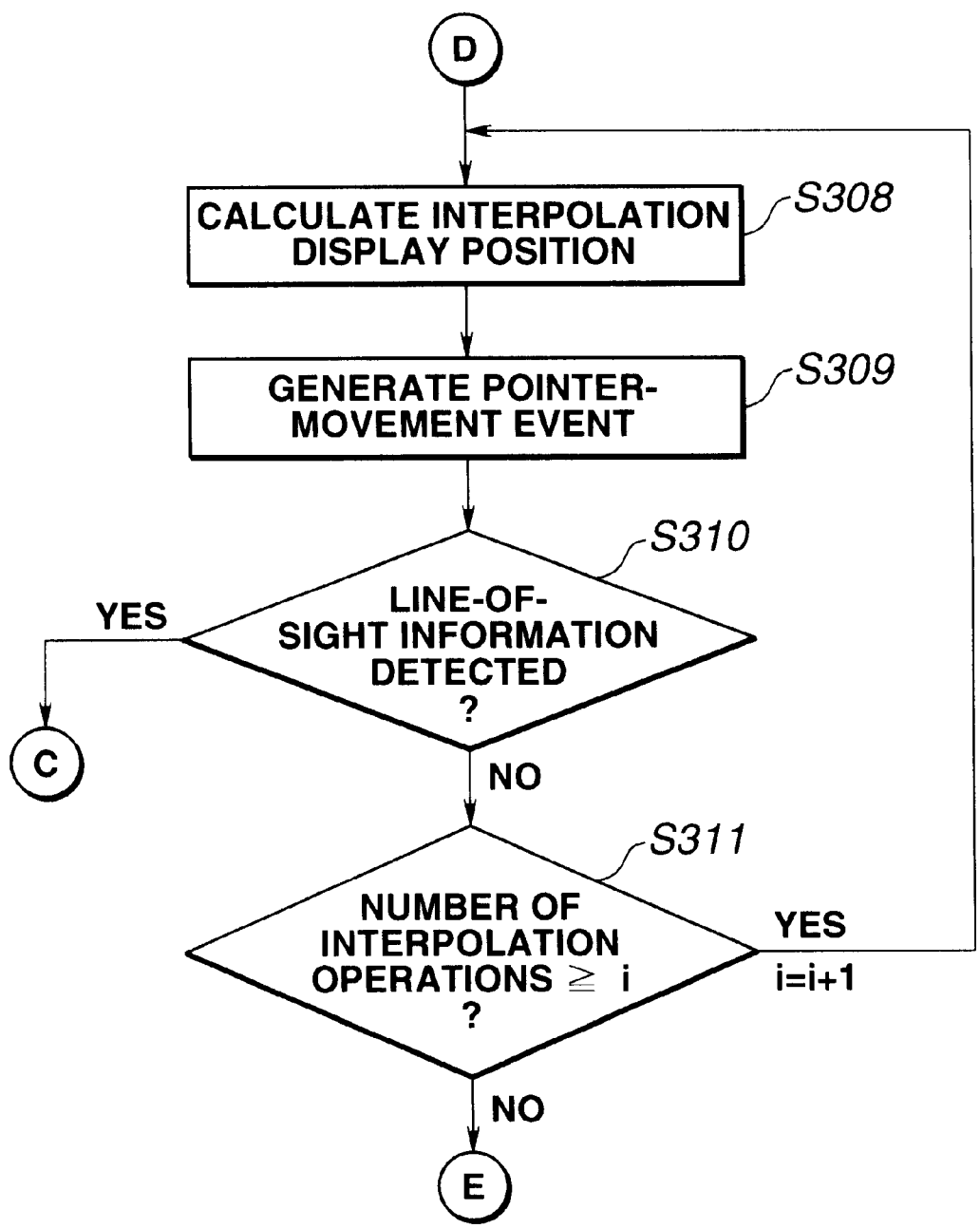

Next, a description will be provided of the flow of processing in the line-of-sight user interface of the second embodiment with reference to the flowchart shown in FIGS. 3 and 4.

First, in step S301, as in the first embodiment, it is determined if the line-of-sight detection device 100 has detected line-of-sight information. If the result of the determination in step S301 is affirmative, the process proceeds to step S302, where it is determined whether information relating to opening/closing (blinking) of the eyes has been detected or line-of-sight information has been detected.

When blinking has been detected in step S302, the process proceeds to step S303, where it is determined whether the time period of closure of the eyes is longer than the time-period threshold for the event set by the user. If the result of the determination in step S303 is affirmative, the process proceeds to step S304, where the event transmission unit 104 transmits an event message which has previously been set by the user to the OS 110, in order to generate an event at the position where the current pointer is present.

If the result of the determination in step S303 is negative, the process returns to step S301, and detection of the next line-of-sight information is awaited. When a line-of-sight position has been detected, information relating to opening/closing of the eyes is reset. When information relating to opening/closing of the eyes has been detected, the time period of closure of the eyes is measured by the line-of-sight-information processing unit 103.

On the other hand, when line-of-sight information has been detected in step S302, processing from step S305 to step S311 is performed. This processing of steps S305–S311 is the same as the processing of steps S202–S208 shown in FIG. 2 according to the first embodiment. Hence, further description thereof will be omitted.

As described above, according to the second embodiment, the line-of-sight user interface includes the line-of-sight-information detection device 100 for detecting the angle of rotation of an eyeball, the line-of-sight-information processing unit 103 for identifying a state of opening/closing of the eyes based on the detected angle of rotation of the eyeball and generating an event based on the time period of closure of the eyes, and an event transmission unit 104 for transmitting the event to the OS 110. Hence, it is possible to move a mouse pointer by utilizing line-of-sight information instead of operating a mouse as in the conventional approach. It is also possible to use several application programs smoothly without releasing the user's hands from the keyboard. Furthermore, by using opening/closing (blinking) of the eyes, instead of clicking or double-clicking a mouse button, it is possible to generate an event to be supported by the OS 110.

As a result, it is possible to use line-of-sight information as a new device for a graphical user interface. Thus, it is unnecessary to alternate between a mouse and a keyboard. Instead, the user's hands are used only on the keyboard, and the mouse, which has previously been operated by the user's hand, can be operated by the user's line of sight.

That is, since conventionally, the keyboard and the mouse are operated by the user's hands, redundant movements of a hand between the keyboard and the mouse are required when using a plurality of application programs on a display, resulting in inefficient operation. To the contrary, by operating a mouse button by the user's lines of sight, the user's hands are used only on the keyboard, resulting in improvement in operational efficiency.

When a left mouse button and a right button are provided, by closing one of the eyes and blinking the other eye, it is possible to perform an operation corresponding to clicking or double-clicking of an appropriate one of the buttons.

Third Embodiment

As in the above-described first embodiment, a line-of-sight user interface according to a third embodiment of the present invention includes a line-of-sight-information detection device 100, an individual-difference correction unit 101, an individual-difference preserving unit 102, a line-of-sight-information processing unit 103 and an event transmission unit 104 (see FIG. 1). Reference numeral 110 represents an operating system (OS). Since the configuration of each unit has already been described in the first embodiment, further description thereof will be omitted.

The method of generating an event to be supported by the OS 110 based on opening/closing of the eyes as shown in the second embodiment may possibly burden the user's eyes depending on the user.

Accordingly, in the system of the third embodiment, an event to be supported by the OS 110 (for example, an event generated by clicking a mouse) is generated by the user's gazing at a point where the event is to be generated, instead of by opening/closing of the eyes. However, since the human eyeballs always vibrate slightly, an ordinary person cannot gaze at a point on a display without deviating by so much as a pixel.

Figure 5:
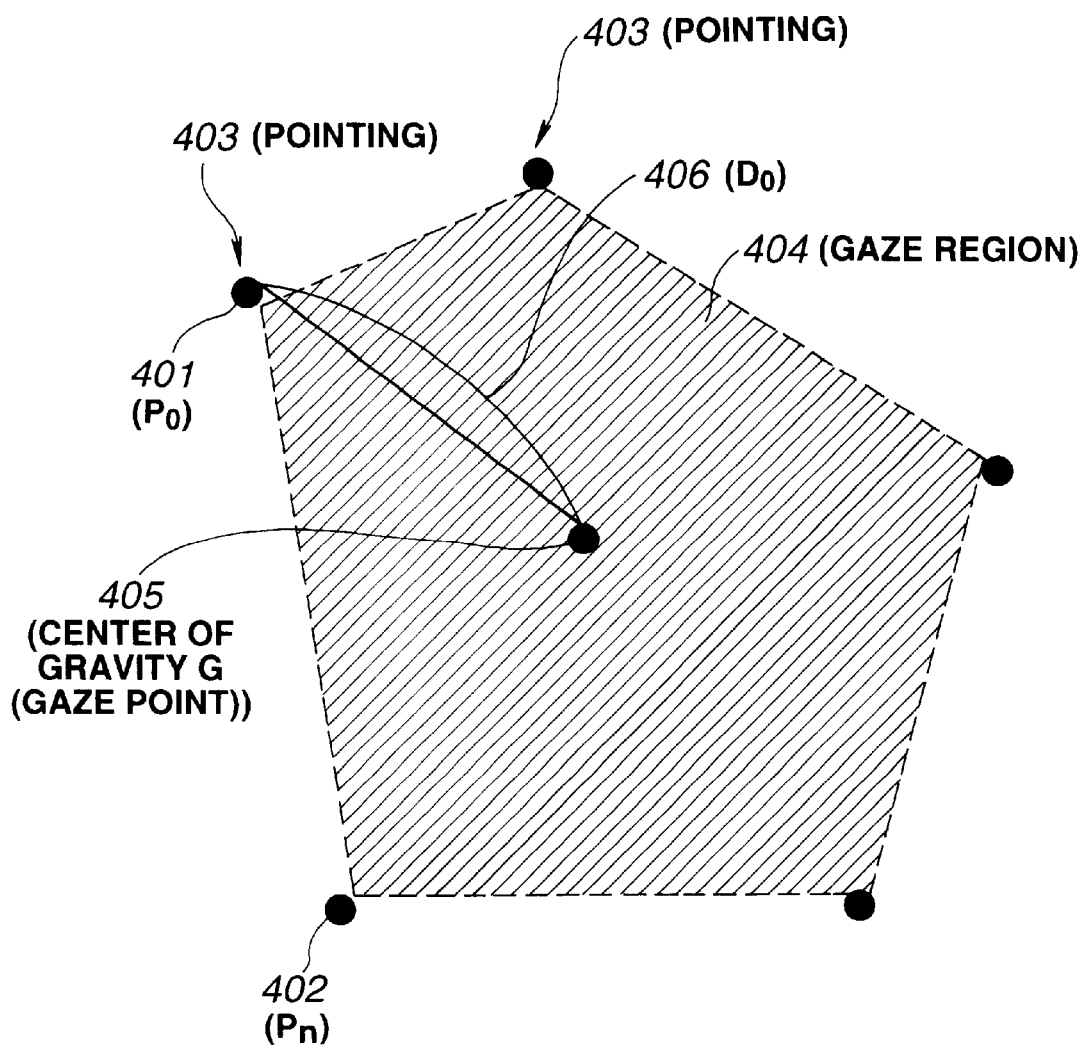
FIG. 5 is a diagram illustrating a manner of determining a gaze region and a gaze point according to a third embodiment of the present invention.

Accordingly, in the third embodiment, the line-of-sight-information processing unit 103 determines whether the user is gazing at a point according to the following approach, which will be described with reference to FIG. 5. FIG. 5 is a diagram illustrating a manner of determining a gaze region and a gaze point. In FIG. 5, reference numerals 401, 402, 403, 404, 405 and 406 represent the latest line-of-sight position, the line-of-sight position subjected to pointing at the n-th preceding time, the point subjected to pointing, the gaze region, the gaze point, and the distance between the gaze point and the line-of-sight position subjected to pointing, respectively.

A region surrounded by past line-of-sight positions $P_i$ ($X_i$, $Y_i$) (i=0, 1, 2, . . . , n) calculated by the line-of-sight-information processing unit 103 in the system of the first embodiment and the latest line-of-sight position $P_0$ ($X_0$, $Y_0$) is used as a gaze region, and the center of gravity $G(X_g, Y_g)$ of the gaze region is considered a gaze point. Accordingly, the gaze point is calculated by the following equations:

$$Xg = 1/n \sum_{i=0}^{n-1} Xi \qquad (3.1)$$

$$Yg = 1/n \sum_{i=0}^{n-1} Yi. \qquad (3.2)$$

Then, the gaze region is determined. It is assumed that the number of points subjected to pointing by lines of sight is n. Since the vibration of an eyeball differs depending on the user, the number n for determining the gaze region can be set for each user. Whether or not the user gazes at a given point is determined by referring to the mean value D_mean of the distances $D_i$ from the center of gravity G to respective points $P_i$ (i=0, 1, 2, 3, . . . , n) constituting the gaze region. The mean value D_mean of the distances is calculated by the following equation:

$$D\_mean = 1/n \sum_{i=0}^{n-1} D_i. \qquad (3.3)$$

If the mean value D_mean of the distances is less than a threshold defined by the user, it is determined that the user is gazing at the point in question, and the event transmission unit 104 transmits an event message to the OS 110 of the computer. The event set by the user is performed by the OS 110 at the point indicated by the pointer.

Figure 6:
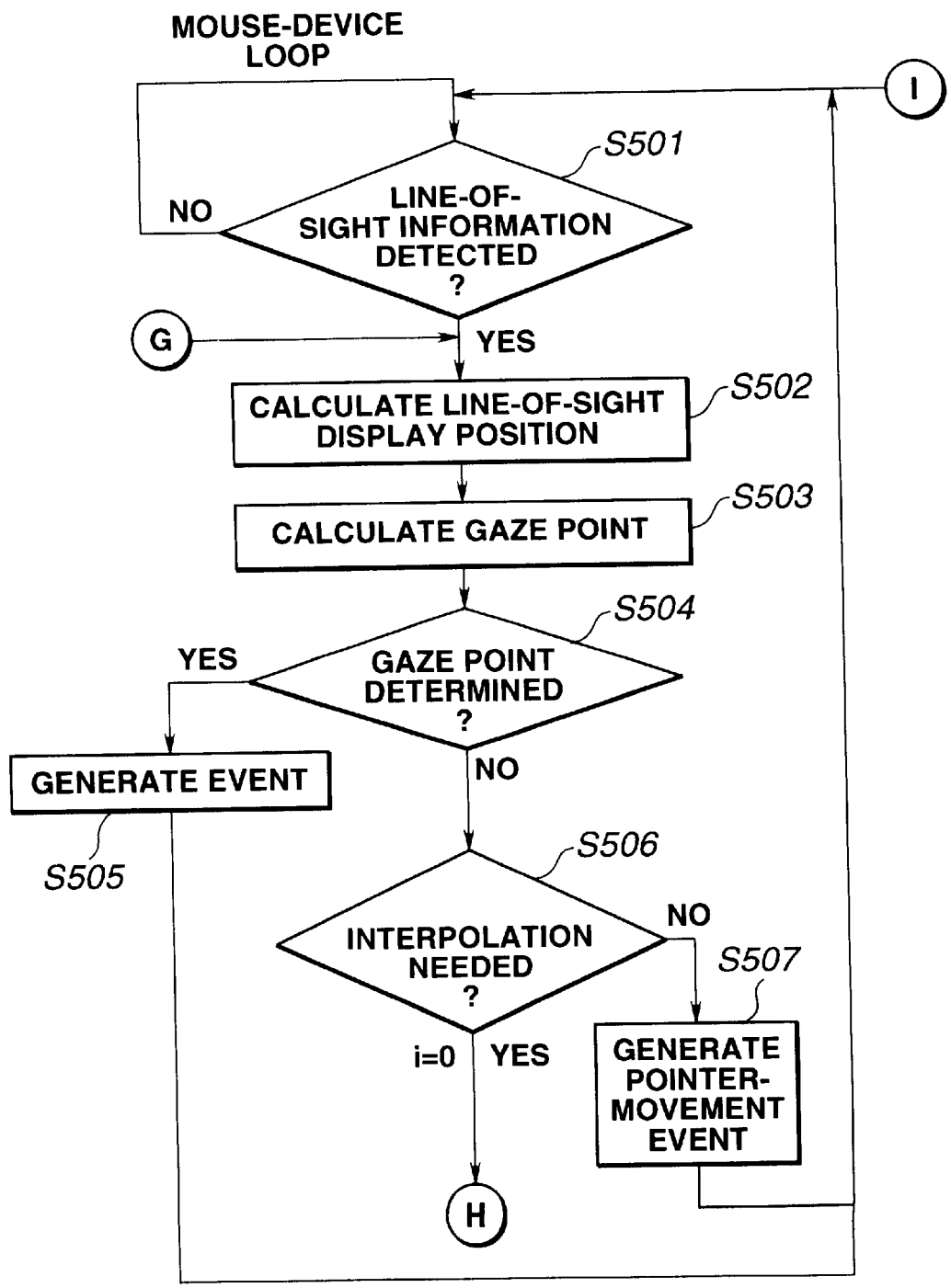
FIGS. 6 and 7 are flowcharts illustrating the flow of processing in the line-of-sight user interface according to the third embodiment.
Figure 7:
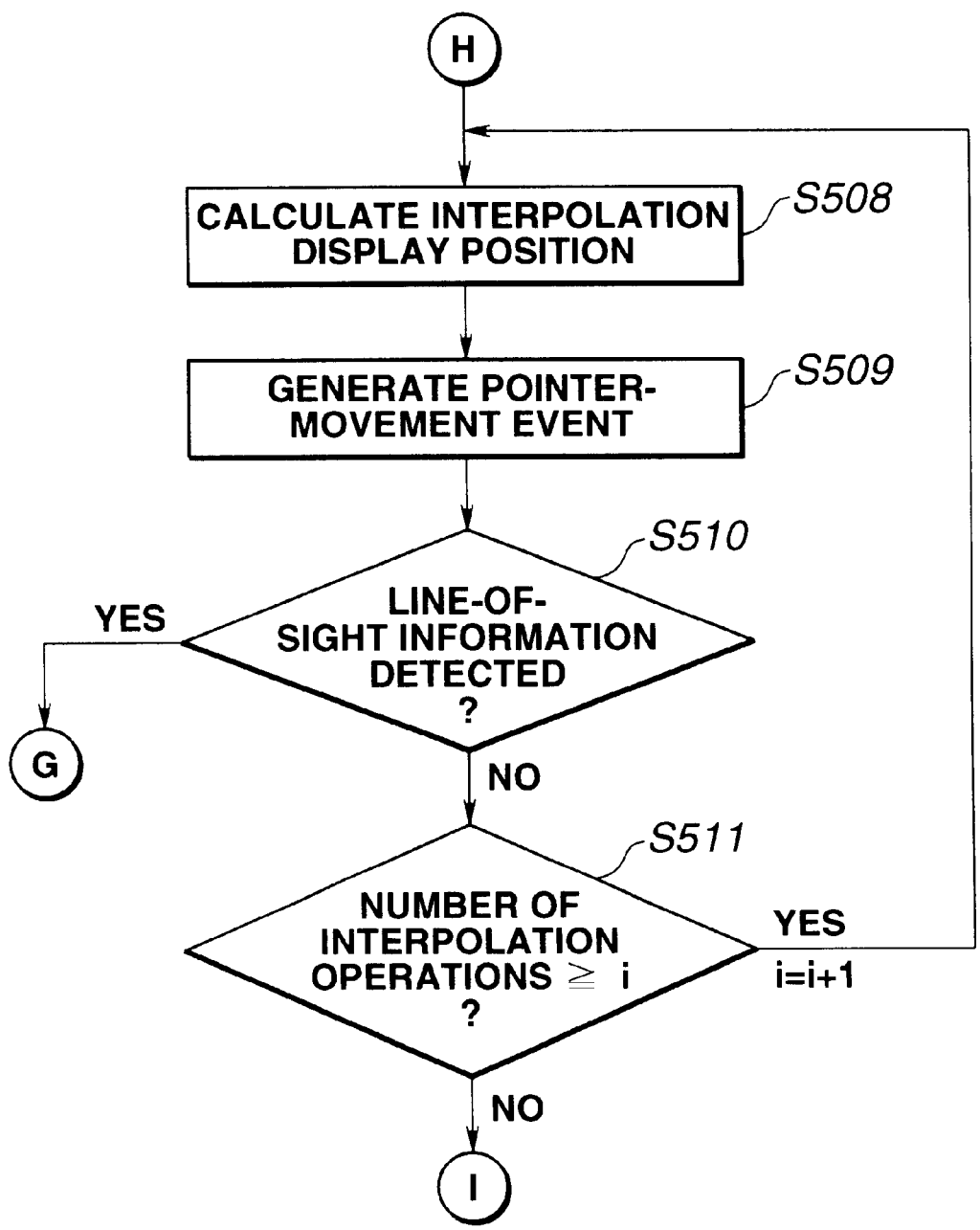

Next, a description will be provided of the flow of processing in the line-of-sight user interface of the third embodiment with reference to the flowchart shown in FIGS. 6 and 7.

First, in steps S501 and S502, as in the first embodiment, the line-of-sight-information detection device 100 detects line-of-sight information, and the line-of-sight-information processing unit 103 calculates the line-of-sight display position. In step S503, the line-of-sight-information processing unit 103 calculates the gaze point according to the above-described method. In step S504, it is determined if the gaze point calculated in step S503 is in the area representing a command that the OS must respond to.

If the result of the determination in step S504 is affirmative, the process proceeds to step S505, where the event transmission unit 104 transmits the event message set by the user to the OS 110 of the computer, and the event is executed. If the result of the determination in step S504 is negative, the process proceeds to step S506, and the same processing as the processing starting from step S203 shown in FIG. 2 in the first embodiment is performed.

As described above, according to the third embodiment, the line-of-sight user interface includes the line-of-sight-information detection device 100 for detecting the angle of rotation of an eyeball, the line-of-sight-information processing unit 103 for calculating a gaze point where the user wants to generate an event based on the detected angle of rotation of the eyeball and generating an event at the gaze point, and the event transmission unit 104 for transmitting an event to the OS 110. Hence, it is possible to move a mouse pointer by utilizing line-of-sight information instead of operating a mouse as in the conventional approach. It is also possible to use several application programs smoothly without releasing the user's hands from the keyboard. Furthermore, by using an operation of gazing at a point instead of clicking or double-clicking a mouse button, it is possible to generate an event to be supported by the OS 110. It is thereby possible to reduce burden on the user's eyes.

As a result, it is possible to use line-of-sight information as a new device for a graphical user interface. Thus, it is unnecessary to alternate between a mouse and a keyboard. Instead, the user's hands are used only on the keyboard, and the mouse, which has previously been operated by the user's hand, can be operated by the user's line of sight.

That is, since conventionally, the keyboard and the mouse are operated by the user's hands, redundant movements of a hand between the keyboard and the mouse are required when using a plurality of application programs on a display, resulting in inefficient operation. To the contrary, by operating a mouse button by the user's line of sight, the user's hands are used only on the keyboard, resulting in improvement in operational efficiency.

Fourth Embodiment

As in the above-described first embodiment, a line-of-sight user interface according to a fourth embodiment of the present invention includes a line-of-sight-information detection device 100, an individual-difference correction unit 101, an individual-difference preserving unit 102, a line-of-sight-information processing unit 103 and an event transmission unit 104 (see FIG. 1). Reference numeral 110 represents an operating system (OS). Since the configuration of each unit has already been described in the first embodiment, further description thereof will be omitted.

Figure 8:
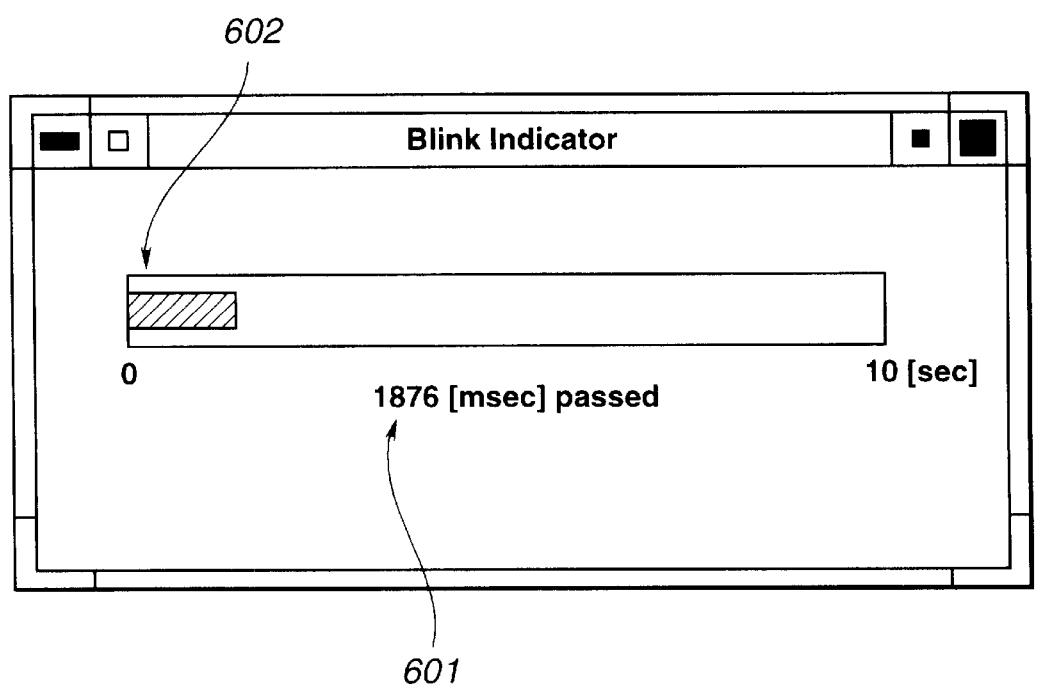
FIG. 8 is a flowchart illustrating an example of UI (UNIX International) for visually displaying a time period of closure of eyeballs according to a fourth embodiment of the present invention.

In the method of generating and transmitting an event message by the user's blink shown in the second embodiment, the user can determine about how many seconds he or she has kept his or her eyes closed, only by estimating the number of seconds elapsed. In the fourth embodiment, this problem is solved by visually displaying the time period of closure of the user's eyes on a display. FIG. 8 is a diagram illustrating an example of UI (UNIX International) for visually displaying the time period of closure of the eyes. In FIG. 8, reference numeral 601 represents a time period elapsed after the user has closed his or her eyes, expressed in msec. An indicator 602 visually displays the time period elapsed after the user has closed his or her eyes. At the same time, the loudspeaker (not shown) tells the time period to the user by sound or artificial voice. By hearing the sound of artificial voice, the user can determine how many seconds he or she has closed his eyes.

As described above, according to the fourth embodiment, the line-of-sight user interface includes the line-of-sight-information detection device 100 for detecting the angle of rotation of an eyeball, the line-of-sight-information processing unit 103 for identifying a state of opening/closing of the eyes based on the detected angle of rotation of the eyeball and generating an event based on the time period of closure of the eyes, and an event transmission unit 104 for transmitting the event to the OS 110, and visually displays the time period elapsed after the user has closed his eyes on a display. Hence, it is possible to move a mouse pointer by utilizing line-of-sight information instead of operating a mouse as in the conventional approach. It is also possible to use several application programs smoothly without releasing the user's hands from the keyboard. Furthermore, by using opening/closing (blinking) of the eyes instead of clicking or double-clicking a mouse button, it is possible to generate an event to be supported by the OS 110. Furthermore, by visually displaying the time period of closure of the user's eyes on a display, the user can determine how many seconds he or she has closed his or her eyes.

As a result, it is possible to use line-of-sight information as a new device for a graphical user interface. Thus, it is unnecessary to alternate between a mouse and a keyboard. Instead, the user's hands are used only on the keyboard, and the mouse, which has previously been operated by the user's hand, can be operated by the user's line of sight.

That is, since conventionally, the keyboard and the mouse are operated by the user's hands, redundant movements of a hand between the keyboard and the mouse are required when using a plurality of application programs on a display, resulting in inefficient operation. To the contrary, by operating a mouse button by the user's line of sight, the user's hands are used only on the keyboard, resulting in improvement in operational efficiency.

Fifth Embodiment

As in the above-described first embodiment, a line-of-sight user interface according to a fifth embodiment of the present invention includes a line-of-sight-information detection device 100, an individual-difference correction unit 101, an individual-difference preserving unit 102, a line-of-sight-information processing unit 103 and an event transmission unit 104 (see FIG. 1). Reference numeral 110 represents an operating system (OS). Since the configuration of each unit has already been described in the first embodiment, further description thereof will be omitted.

In the method of generating and transmitting an event message according to determination of a gaze state shown in the third embodiment, the user cannot tell when his or her eyeballs are fluctuating in position. For example, even if the user intends to fixedly gaze at a single point on the display, there is a possibility the gaze fluctuating too much to permit identification of any one point as the object of the gaze. This problem can arise from inconsistency between the threshold defined by the user and fluctuation of the eyeballs.

Figure 9:
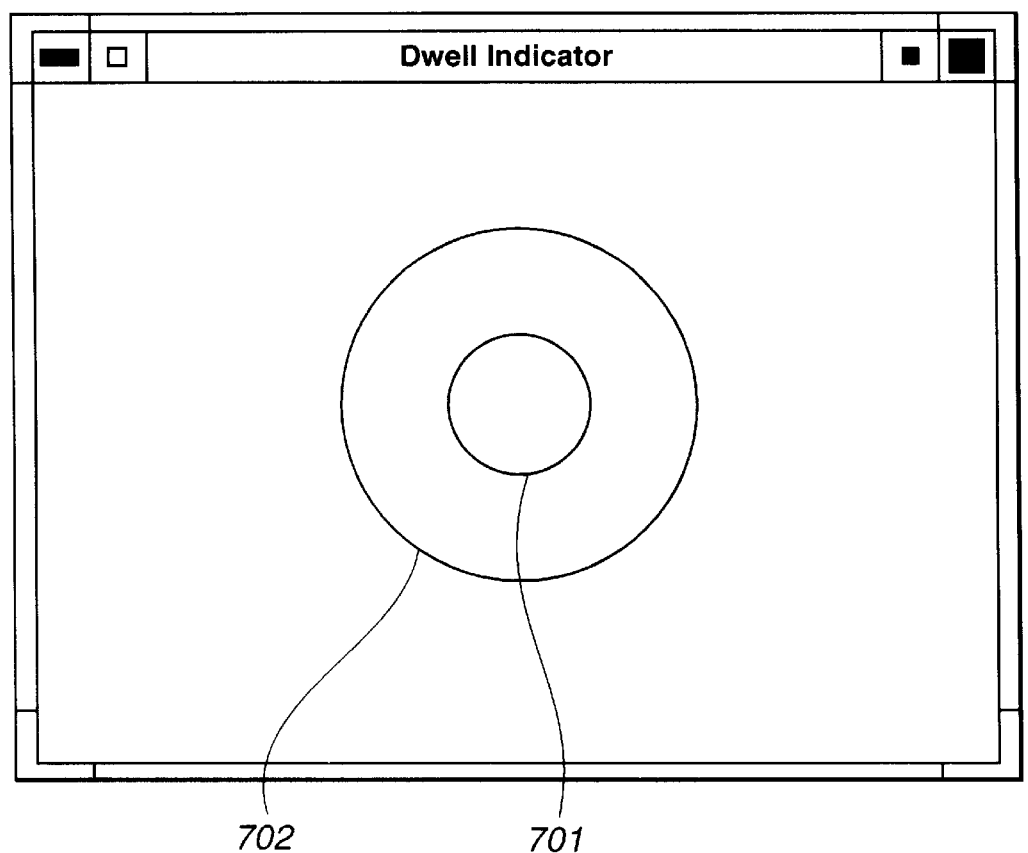
FIG. 9 is a flowchart illustrating an example of UI for visually displaying a gaze state according to a fifth embodiment of the present invention.

In the fifth embodiment, this problem is solved by visually displaying the magnitude of fluctuation of the eyeballs, i.e., the size of the gaze region when the user is trying to gaze at one point, and the threshold, on a display. FIG. 9 is a diagram illustrating an example of UI for visually displaying the gaze state according to the fifth embodiment. In FIG. 9, reference numeral 701 represents a circle whose radius corresponds to the threshold set by the user, and reference numeral 702 represents a circle whose radius is the above-described D_mean which is necessary when determining the gaze point.

The circle 702 is successively updated and displayed by the value D_mean calculated by the line-of-sight-information processing unit 103. The user can visually understand his gaze state by changes in the size of the circle 702. The event set by the user is generated when the circle 702 becomes smaller than the circle 701.

As described above, according to the fifth embodiment, the line-of-sight user interface includes the line-of-sight-information detection device 100 for detecting the angle of rotation of an eyeball, the line-of-sight-information processing unit 103 for calculating the gaze point in consideration of fluctuations of the eyeball, based on the detected angle of rotation of the eyeball, and generating an event at the gaze point, and an event transmission unit 104 for transmitting an event to the OS 110, and visually displays the size of the gaze region when gazing at one point and the threshold on a display. Hence, it is possible to move a mouse pointer by utilizing line-of-sight information instead of operating a mouse as in the conventional approach. It is also possible to use several application programs smoothly without releasing the user's hands from the keyboard. Furthermore, by using an operation of gazing at one point instead of clicking or double-clicking a mouse button, it is possible to generate an event to be supported by the OS 110. Furthermore, by visually displaying the size of the gaze region and the threshold on a display, the user can recognize fluctuation of his or her eyeballs.

As a result, it is possible to use line-of-sight information as a new device for a graphical user interface. Thus, it is unnecessary to alternately use a mouse and a keyboard. Instead, the user's hands are used only on the keyboard, and the mouse, which has previously been operated by the user's hand, can be operated by the user's line of sight.

That is, since conventionally, the keyboard and the mouse are operated by the user's hands, redundant movements of a hand between the keyboard and the mouse are required when using a plurality of application programs on a display, resulting in inefficient operation. To the contrary, by operating a mouse button by the user's line of sight, the user's hands are used only on the keyboard, resulting in improvement in operational efficiency.

Sixth Embodiment

As in the above-described first embodiment, a line-of-sight user interface according to a sixth embodiment of the present invention includes a line-of-sight-information detection device 100, an individual-difference correction unit 101, an individual-difference preserving unit 102, a line-of-sight-information processing unit 103 and an event transmission unit 104 (see FIG. 1). Reference numeral 110 represents an operating system (OS). Since the configuration of each unit has already been described in the first embodiment, further description thereof will be omitted.

Generation and transmission of an event message set by the user using control (opening/closing, gazing) of the eyes as described in the second and third embodiments may burden the user's eyes.

Accordingly, in the sixth embodiment, the user utilizes his or her line of sight only for moving a pointer, and an event message is generated and transmitted by a key input from a keyboard. Since this method does not utilize a mouse, the operation can be efficiently performed.

Figure 10:
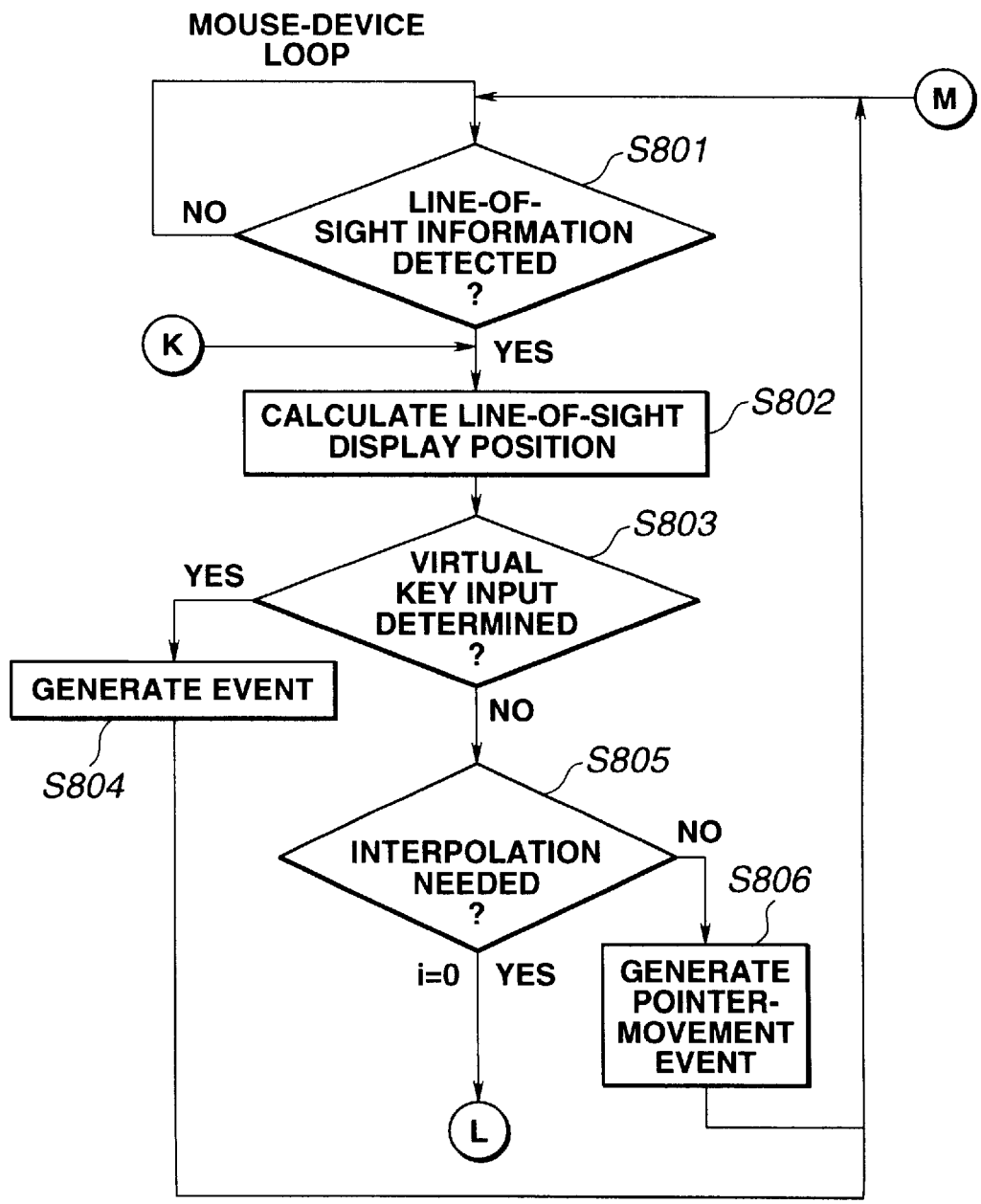
FIGS. 10 and 11 are flowcharts illustrating the flow of processing in the line-of-sight user interface according to a sixth embodiment of the present invention.
Figure 11:
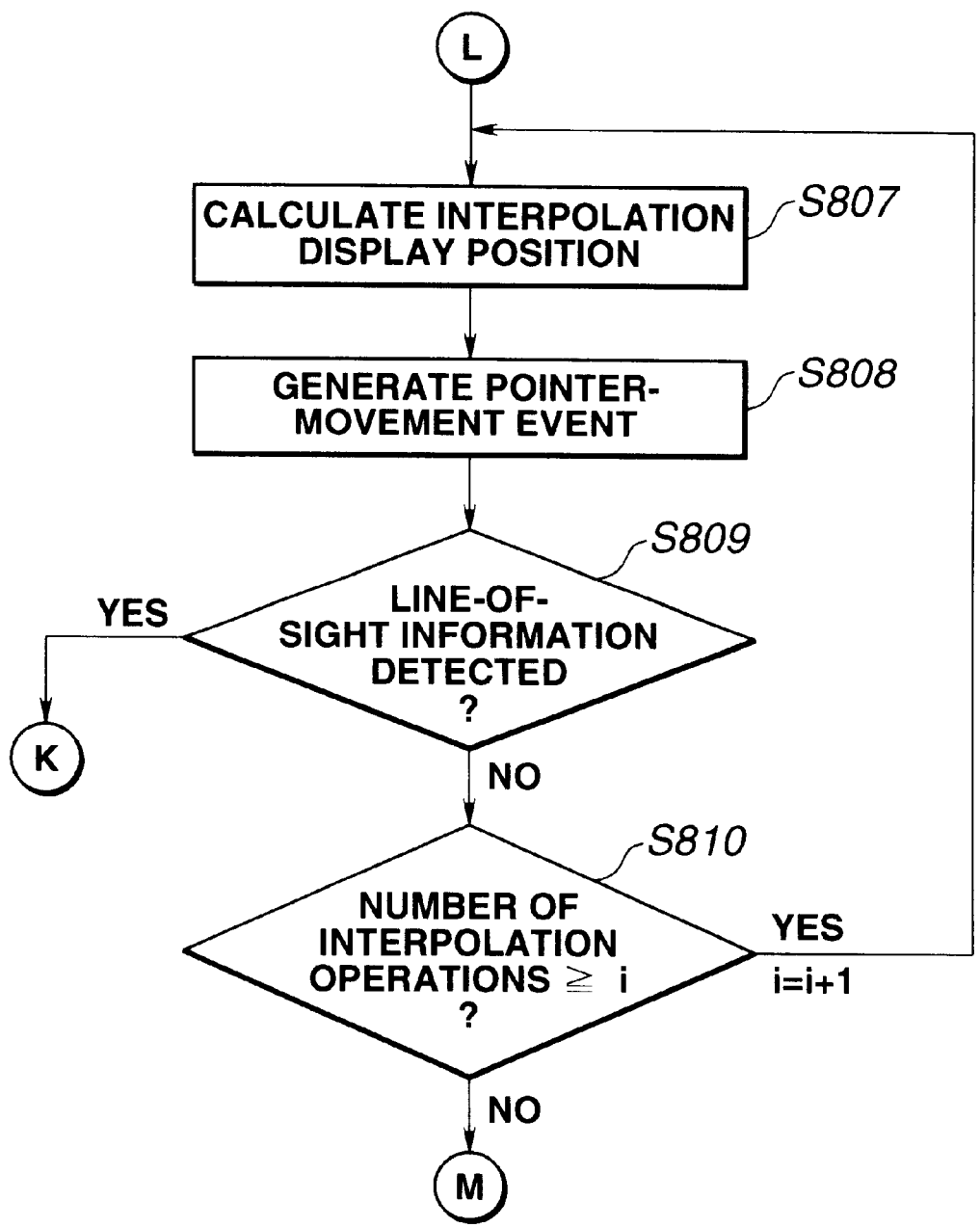

Next, a description will be provided of the flow of processing in the line-of-sight user interface according to the sixth embodiment with reference to the flowcharts shown in FIGS. 10 and 11.

First, in steps S801 and S802, as in the first embodiment, the line-of-sight-information detection device 100 detects line-of-sight information, and the line-of-sight-information processing unit 103 calculates the line-of-sight display position. In step S803, it is determined if a vertual key input from the user is present.

If the result of the determination in step S803 is affirmative, the process proceeds to step S804, where the event transmission unit 104 transmits an event message set by the user to the OS 110. If the result of the determination in step S803 is negative, the process proceeds to step S805, and the same processing as the processing starting from step S203 shown in FIG. 2 in the first embodiment is performed.

As described above, according to the sixth embodiment, the line-of-sight user interface includes the line-of-sight-information detection device 100 for detecting the angle of rotation of an eyeball, the line-of-sight-information processing unit 103 for moving a pointer based on the user's line of sight and generating an event based on a key input from a keyboard, and an event transmission unit 104 for transmitting the event to the OS 110. Hence, it is possible to move a mouse pointer by utilizing line-of-sight information instead of operating a mouse as in the conventional approach. It is also possible to use several application programs smoothly without releasing the user's hands from the keyboard. Furthermore, by using a virtual key on the keyboard instead of clicking or double-clicking a mouse button, it is possible to generate an event to be supported by the OS 110. Furthermore, since the user utilizes his line of sight only for moving the pointer, and an event message is generated and transmitted by a virtual key input from the keyboard, a mouse is not utilized. Hence, an operation can be efficiently performed.

As a result, it is possible to use line-of-sight information as a new device for a graphical user interface. Thus, it is unnecessary to alternate between a mouse and a keyboard. Instead, the user's hands are used only on the keyboard, and the mouse, which has previously been operated by the user's hand, can be operated by the user's line of sight.

That is, since conventionally, the keyboard and the mouse are operated by the user's hands, redundant movements of a hand between the keyboard and the mouse are required when using a plurality of application programs on a display, resulting in inefficient operation. To the contrary, by operating a mouse button by the user's line of sight, the user's hands are used only on the keyboard, resulting in improvement in operational efficiency.

Seventh Embodiment

As in the above-described first embodiment, a line-of-sight user interface according to a seventh embodiment of the present invention includes a line-of-sight-information detection device 100, an individual-difference correction unit 101, an individual-difference preserving unit 102, a line-of-sight-information processing unit 103 and an event transmission unit 104 (see FIG. 1). Reference numeral 110 represents an operating system (OS). Since the configuration of each unit has already been described in the first embodiment, further description thereof will be omitted.

When inputting a text, it is unnecessary to display the user's line-of-sight position with a pointer.

Accordingly, in the seventh embodiment, when the user's line of sight is directed at the surface of a display and the movement of the line of sight is small, the pointer is made stationary.

Figure 12:
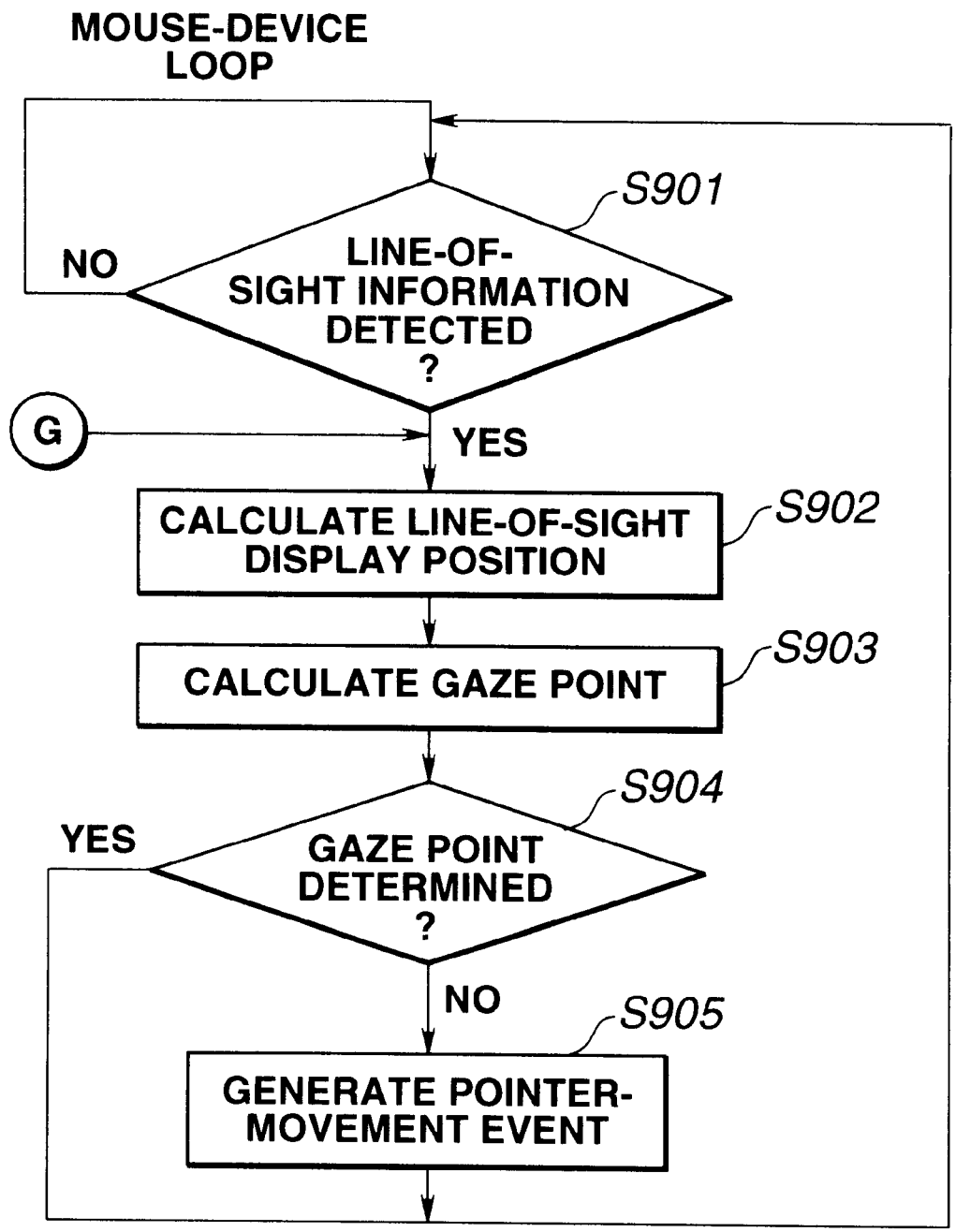
FIG. 12 is a flowchart illustrating the flow of processing in the line-of-sight user interface according to a seventh embodiment of the present invention.

Next, a description will be provided of the flow of processing in the line-of-sight user interface according to the sixth embodiment with reference to the flowchart shown in FIG. 12.

First, in steps S901 and S902, as in the first embodiment, the line-of-sight-information detection device 100 detects line-of-sight information, and the line-of-sight-information processing unit 103 calculates the line-of-sight display position. In step S903, the gaze point is calculated. In step S904, the gaze point is determined. The determination of the gaze point is performed according to the method shown in the third embodiment.

If the result of the determination in step S904 is affirmative, the process returns to step S901 without moving the pointer. If the result of the determination in step S904 is negative, the process proceeds to step S905, where a pointer-movement-event message is transmitted from the event transmission unit 104 to the OS 110 of the computer.

As described above, according to the seventh embodiment, the line-of-sight user interface includes the line-of-sight-information detection device 100 for detecting the angle of rotation of an eyeball, the line-of-sight-information processing unit 103 for calculating the gaze point in consideration of fluctuation of the eyeball based on the detected angle of rotation of the eyeball and generating an event at the gaze point, and an event transmission unit 104 for transmitting an event to the OS 110. When the user's line of sight is directed at the surface of the display and the movement of the line of sight is small, the pointer is made stationary. Hence, it is possible to move a mouse pointer by utilizing line-of-sight information instead of operating a mouse as in the conventional approach. It is also possible to smoothly use several application programs without releasing the user's hands from the keyboard. Furthermore, by using the angles of rotation of the eyeballs instead of clicking or double-clicking a mouse button, it is possible to generate an event to be supported by the OS 110. Furthermore, by making the pointer stationary when the user's line of sight is directed at the surface of the display and the movement of the line of sight is small, it is unnecessary to display the user's line-of-sight position by a pointer when inputting text.

As a result, it is possible to use line-of-sight information as a new device for a graphical user interface. Thus, it is unnecessary to alternate between a mouse and a keyboard. Instead, the user's hands are used only on the keyboard, and the mouse, which has previously been operated by the user's hand, can be operated by the user's line of sight.

That is, since conventionally, the keyboard and the mouse are operated by the user's hands, redundant movements of a hand between the keyboard and the mouse are required when using a plurality of application programs on a display, resulting in inefficient operation. To the contrary, by operating a mouse button by the user's line of sight, the user's hands are used only on the keyboard, resulting in improvement in operational efficiency.

Eighth Embodiment

As in the above-described first embodiment, a line-of-sight user interface according to an eighth embodiment of the present invention includes a line-of-sight-information detection device 100, an individual-difference correction unit 101, an individual-difference preserving unit 102, a line-of-sight-information processing unit 103 and an event transmission unit 104 (see FIG. 1). Reference numeral 110 represents an operating system (OS). Since the configuration of each unit has already been described in the first embodiment, further description thereof will be omitted.

When the line-of-sight-information detection device 100 detects a line of sight for each of the user's eyes in the fourth embodiment, it is difficult to see an indicator displayed on the display.

This problem is solved in the eighth embodiment by representing the time period of closure of the user's eyes by a sound. For example, by performing control such that, when the user has closed his or her eyes, generation of a low-frequency sound from a predetermined sound generation mechanism is started, and the frequency of the sound is increased in accordance with the lapse of the time period of closure of the eyes, the user can recognize the time period of closure of his eyes.

As described above, according to the eighth embodiment, the line-of-sight user interface includes the line-of-sight-information detection device 100 for detecting the angles of rotation of eyeballs, the line-of-sight-information processing unit 103 for identifying the state of opening/closing of the eyeballs based on the detected angles of rotation of the eyeballs and generating an event based on the time period of closure of the eye, and an event transmission unit 104 for transmitting an event to the OS 110, and the time period of closure of the user's eyes is represented by a sound. Hence, it is possible to move a mouse pointer by utilizing line-of-sight information instead of operating a mouse as in the conventional approach. It is also possible to use several application programs smoothly without releasing the user's hands from the keyboard. Furthermore, by using opening/closing (blinking) of the eyes instead of clicking or double-clicking a mouse button, it is possible to generate an event to be supported by the OS 110. Furthermore, by representing the time period of closure of the user's eyes by a sound, the user can recognize the time period of closure of his or her eyes.

As a result, it is possible to use line-of-sight information as a new device for a graphical user interface. Thus, it is unnecessary to alternate between a mouse and a keyboard. Instead, the user's hands are used only on the keyboard, and the mouse, which has previously been operated by the user's hand, can be operated by the user's line of sight.

That is, since conventionally, the keyboard and the mouse are operated by the user's hands, redundant movements of a hand between the keyboard and the mouse are required when using a plurality of application programs on a display, resulting in inefficient operation. To the contrary, by operating a mouse button by the user's line of sight, the user's hands are used only on the keyboard, resulting in improvement in operational efficiency.

The present invention may be applied to a system comprising a plurality of apparatuses, or to a apparatus comprising a single unit. The objects of the present invention may, of course, be achieved by supplying a system or an apparatus with a storage medium storing program codes of software for realizing the functions of the above-described embodiments, and reading and executing the program codes stored in the storage medium by means of a computer (or a CPU or an MPU (microprocessing unit)) of the system or the apparatus.

In such a case, the program codes themselves read from the storage medium realize the functions of the above-described embodiments, so that the storage medium storing the program codes constitutes the present invention.

For example, a floppy disk, a hard disk, an optical disk, a magnetooptical disk, a CD-ROM (compact disc-read only memory), a CD-R (recordable), a magnetic tape, a non-volatile memory card, a ROM or the like may be used as the storage medium for supplying the program codes.

The present invention may, of course, be applied not only to a case in which the functions of the above-described embodiments are realized by executing program codes read by a computer, but also to a case in which an OS or the like operating in a computer executes a part or the entirety of actual processing, and the functions of the above-described embodiments are realized by the processing.

The present invention may, of course, be applied to a case in which, after writing program codes read from a storage medium into a memory provided in a function expanding board inserted into a computer or in a function expanding unit connected to the computer, a CPU or the like provided in the function expanding board or the function expanding unit performs a part or the entirety of actual processing, and the functions of the above-described embodiments are realized by the processing.

As described above, according to the first through eighth embodiments, it is possible to use line-of-sight information as a new device for a graphical user interface. Thus, it is unnecessary to use a mouse and a keyboard alternately. Instead, the user's hands are used only on the keyboard, and the mouse, which has previously been operated by the user's hand, can be operated by the user's line of sight. That is, since conventionally, the keyboard and the mouse are operated by the user's hands, redundant movements of a hand between the keyboard and the mouse are required when using a plurality of application programs on a display, resulting in inefficient operation. To the contrary, by operating a mouse button by the user's line of sight, the user's hands are used only on the keyboard, resulting in improvement in operational efficiency.

It is also possible to move a pointer smoothly according to interpolation display.

The user can exactly recognize the time period of closure of his or her eyes.

The user can exactly determine whether he or she is gazing at a point or whether the eye position is fluctuating by referring to a display of the gaze state.

By utilizing the user's line of sight only for moving a pointer, and generating and transmitting an event by performing a key input from a keyboard, the user can efficiently perform.

When, for example, the user inputs a text, it is unnecessary to display the user's line-of-sight position with a pointer.

The individual components shown in outline or designated by blocks in the drawings are all well known in the line-of-sight-information input apparatus and method arts, and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A line-of-sight-information input apparatus for performing an input operation by utilizing a line of sight, said apparatus comprising:

detection means for detecting an angle of rotation of an eyeball of a user;

correction means for correcting the detected angle of rotation of the eyeball, according to the user;

control means for calculating a line-of-sight position based on the corrected angle of rotation of the eyeball and for generating an event at the line-of-sight position; and transmission means for transmitting the event to a host system.

2. An apparatus according to claim 1, wherein said control means displays a pointer at the calculated line-of-sight position on said display means, and calculates a line-of-sight position for interpolation for displaying a virtual line-of-sight position between the line-of-sight position and a line-of-sight position calculated at a next calculation.

3. An apparatus according to claim 2, wherein said control means keeps the pointer in a stationary state when a movement of the line of sight is small.

4. A line-of-sight-information input apparatus for performing an input operation by utilizing a line of sight, said apparatus comprising:

detection means for detecting an angle of rotation of an eyeball of a user;

control means for identifying a state of opening/closing of the eyeball based on the detected angle of rotation of the eyeball, and for generating an event based on how long the eyeball is kept closed; and transmission means for transmitting the event to a host system.

5. An apparatus according to claim 4, further comprising display means for visually displaying how long the eyeball has been kept closed.

6. An apparatus according to claim 4, wherein a length of time the eyeball is kept closed, is represented by emission of at least one sound.

7. A line-of-sight-information input apparatus for performing an input operation by utilizing a line of sight, said apparatus comprising:

detection means for detecting an angle of rotation of an eyeball of a user;

control means for calculating a gaze point in consideration of fluctuation of the eyeball based on the detected angle of rotation of the eyeball, and for generating an event at the gaze point; and transmission means for transmitting the event to a host system.

8. An apparatus according to claim 7, further comprising display means for visually displaying an indication of a gaze state.

9. An apparatus according to any one of claims 1, 4 and 7, wherein the generation of the event can be performed by a key input from a keyboard.

10. An apparatus according to any one of claims 1, 4 and 7, wherein said transmission means transmits the event to an operating system of a computer for supporting the event.

11. A line-of-sight-information input method for performing an input operation by utilizing a line of sight, said method comprising:

a detection step of detecting an angle of rotation of an eyeball of a user;

a correction step of correcting the detected angle of rotation of the eyeball, according to the user;

a control step of calculating a line-of-sight position based on the corrected angle of rotation of the eyeball and generating an event at the line-of-sight position; and a transmission step of transmitting the event to a host system.

12. A method according to claim 11, wherein in said control step, a pointer is displayed at the calculated line-of-sight position on display means, and a line-of-sight position for interpolation for displaying a virtual line-of-sight position between the line-of-sight position and a line-of-sight position calculated at a next calculation is calculated.

13. A method according to claim 12, wherein, in said control step, the pointer is kept in a stationary state when a movement of the line of sight is small.

14. A line-of-sight-information input method for performing an input operation by utilizing a line of sight, said method comprising:

a detection step of detecting an angle of rotation of an eyeball of a user;

a control step of identifying a state of opening/closing of the eyeball based on the detected angle of rotation of the eyeball and generating an event based on how long the eyeball is kept closed; and a transmission step of transmitting the event to a host system.

15. A method according to claim 14, further comprising a display step of visually displaying how long the eyeball has been kept closed.

16. A method according to claim 14, wherein a length of time the eyeball is kept closed, is represented by emission of at least one sound.

17. A line-of-sight-information input method for performing an input operation by utilizing a line of sight, said method comprising:

a detection step of detecting an angle of rotation of an eyeball of a user;

a control step of calculating a gaze point in consideration of fluctuation of the eyeball based on the detected angle of rotation of the eyeball, and for generating an event at the gaze point; and a transmission step of transmitting the event to a host system.

18. A method according to claim 17, further comprising a display step of visually displaying an indication of a gaze state.

19. A method according to any one of claims 11, 14 and 17, wherein the generation of the event can be performed by a key input from a keyboard.

20. A method according to any one of claims 11, 14 and 17, wherein, in said transmission step, the event is transmitted to an operating system of a computer for supporting the event.

21. A storage medium storing a program for performing an input operation by utilizing a line of sight, said program comprising:
- a detection module for detecting an angle of rotation of an eyeball of a user;
- a correction module for correcting the detected angle of rotation of the eyeball, according to the user;
- an event generation module for calculating a line-of-sight position based on the corrected angle of rotation of the eyeball and for generating an event at the line-of-sight position; and
- a transmission module for transmitting the generated event to a host system.

* * * * *